July 24, 1962 M. L. HAWKINS 3,045,794
APPARATUS FOR ORGANIC TYPOGRAPHY
Filed Jan. 22, 1960 5 Sheets-Sheet 1
Fig. 1:
Fig. 2:
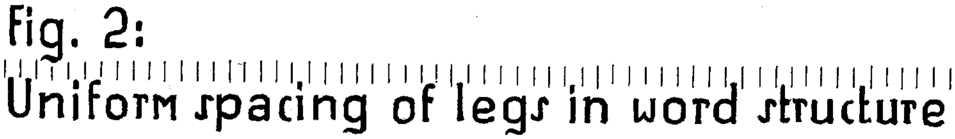
Fig. 3-
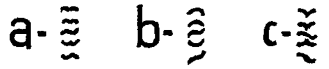
Fig. 4:
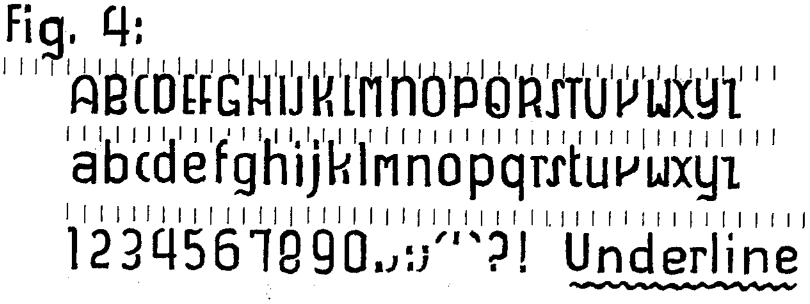
Fig. 5
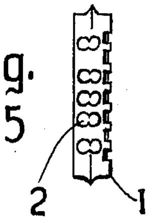
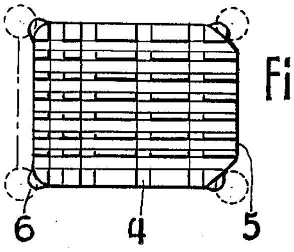
Fig. 6
Fig. 7
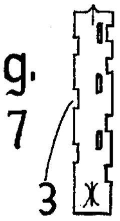
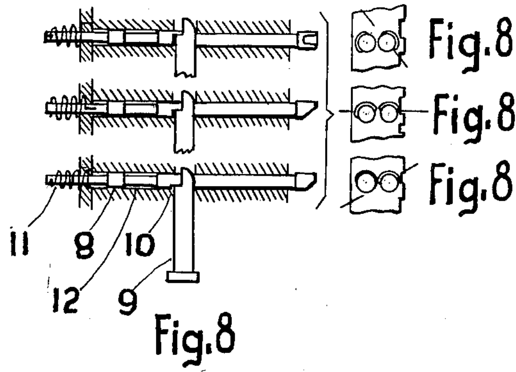
Fig.8c Fig.8b Fig.8a
Fig.8
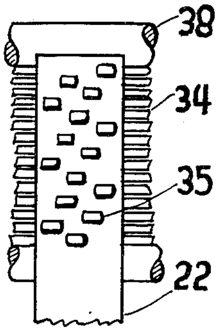
Fig. 9
INVENTOR
Merrill Laurence Hawkins Merrill Lawrence Hawkins
INVENTOR July 24, 1962 M. L. HAWKINS 3,045,794

APPARATUS FOR ORGANIC TYPOGRAPHY

Filed Jan. 22, 1960 5 Sheets-Sheet 3

INVENTOR.

Merrill Lawrence Hawkins

BY

ATTORNEY

Fig. 12 (a)

Two conventions provide precedents for modern machine typography. One is the classical Roman convention in which emphasis is placed upon the beauty of contour of individual letters such as carved on stone monuments by artists for whom the possible beauty of each separate letter presented a separate challenge. The other is the Gothic convention as developed in the hand-lettered manuscripts of the Middle Ages. Herein, the artist is working rapidly and is thinking in terms of words rather than of separate letters. Accordingly, the word comes naturally to be treated as the unit of typography.

(b)

The findings of Gestalt psychology and experiments conducted with the aid of the tachistoscope not available to early type designers, now confirm the discovery that the Gothic convention should have dictated the transition to machine typography, due to the fact that reading is not by letters but by words. In fact, rapid reading is by groups of words, the largest whole that the mind is able to assimilate at one glance. But designers of type for the letter-press, unaware that the mind does not first single out separate letters unless challenged by some disrupting disharmony, accepted the Roman convention making of them designers primarily of letters and of words only secondarily, the reverse of good practise.

INVENTOR.
Merrill Lawrence Hawkins

BY

ATTORNEY

July 24, 1962 M. L. HAWKINS 3,045,794

APPARATUS FOR ORGANIC TYPOGRAPHY

Filed Jan. 22, 1960 5 Sheets-Sheet 5

Merrill Laurence Hawkins

INVENTOR

United States Patent Office 3,045,794

Patented July 24, 1962

3,045,794

APPARATUS FOR ORGANIC TYPOGRAPHY

Merrill Lawrence Hawkins, Yorktown Heights, N.Y.
(785 Locksley Road, R.D. 2, Peeksville, N.Y.)

Filed Jan. 22, 1960, Ser. No. 4,155
10 Claims. (Cl. 197—1)

This application is a continuation-in-part of application Serial No. 338,693, filed February 25, 1953, and now abandoned.

This invention relates to apparatus for Organic Typography, a new genus of machine typography arising from the findings of Gestalt Psychology that fluent reading does not require us to single out separate letters. Children learn to read words and assimilate their meaning before they learn the alphabet, and rapid reading encourages the eye to focus on the minimum of syllabic and word wholes that carry the meaning. Organic Typography supports this reading efficiency in the various ways described herewith peculiar to it and to it alone.

Figures 1A, 1B, 1C, 1D, 1E, 1F, 1G, 1H:
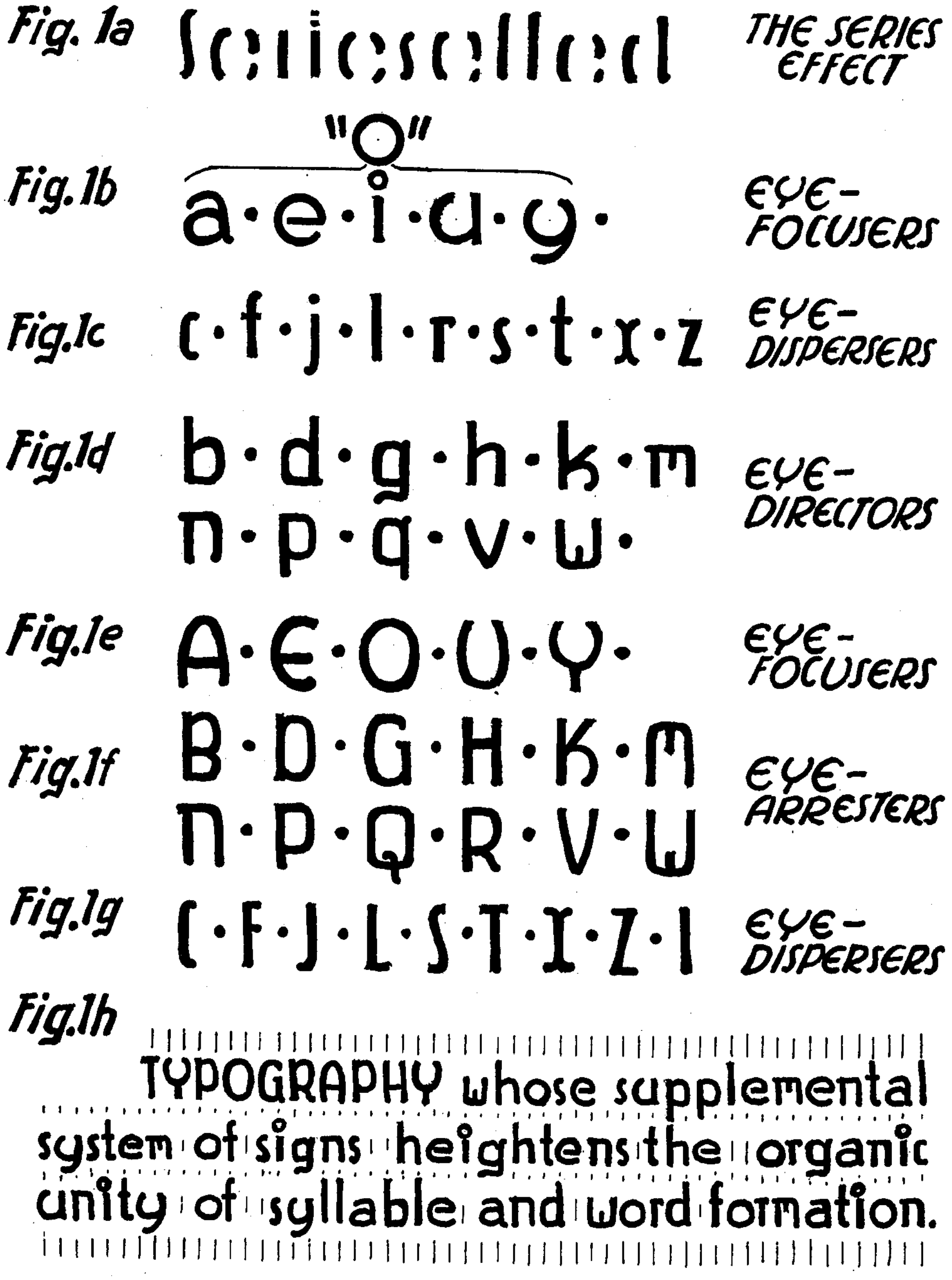

Organic Typography's limitation to single-double letter-spacing maximizes "the series effect" illustrated in FIGS. 1 and 1*a* of the accompanying drawings. This "series effect" helps the reader to scan lines faster by accepting word-structures as integrated wholes in the same way he accepts the colonnade-front of a building or of a centipede resting on its multiplicity of equally disposed legs. The viewer is restrained from singling out separate columns or separate legs or sectors unless prompted by further features purposely introduced to serve as centers of focus for his more detailed attention.

Secondly, Organic Typography helps the eye to focus on syllabic wholes and nothing less. This reduces the number of wholes to be singled out to no more than the number singled out in oral communication wherein each syllable remains a single complex of sound formed about its particular vowel sound. Thus, instead of singling out the separate letters of "back" pronounced "bee-aa-cee-ka," it remains a rapidly spoken, unbroken whole of sound. And when direct correspondence is thus secured between the organics of communication by sound and by print, the cross-over identification of words and their meanings thus reinforced in both, contributes significantly to the efficiency of both modes of communication.

In support of this organics of printed syllables formed of eye-directing consonants about eye-focusing vowels, four degrees of distinction can be found to intervene between the ideal of eye-focusing shapes for the design of vowels and the ideal of eye-dispersing shapes for the design of consonants, all as illustrated in FIGS. 1*a* thru 1*g*.

Thus the building of this organically correlated alphabet that imparts extra directives of meaning to printed syllables beings with the eye-focusing vowel "o" shown in FIG. 1*b* directly associated with the basic, open-throat sound in oral communication. And it continues with the direct modifications thereof in "a," "e," "u" and "y" that we have come to associate with corresponding modifications of this open-throat sound around which syllables are formed. But to impart due eye-focusing effect to the vowel "i" we must enlarge its dot into the open circle shown. Thus—

(A) FIGS. 1*b* and 1*e* illustrate the ideal of top-rounded "eye-focusers."

(B) FIGS. 1*c* and 1*g* illustrate the ideal of single-leg "eye-dispersers" that maximize "the series effect" and facilitate the fluid scanning of lines.

(C) FIG. 1*d* indicates the sort of modification of letters of double leg construction in which each "eye-dispersing" leg is flanked by a "peaked and angled" appendage converting it into an "eye-directing" consonant. This illustrates only one of innumerable ways to reduce eye-focusing into eye-directing shapes and so to differentiate the syllable-forming function of consonants from that of vowels.

(D) FIG. 1*f* indicates that all capital letters tend to be "eye-arresters" important to their use in headings and display typography to attract and hold attention rather than to maximize rapid reading. But even here, sufficient contrast can be secured between top-rounded vowels and peaked consonants to encourage reading by syllables rather than by separate letters.

Thus, if a printed line happens to be made up of 60 letters and 16 syllables, our coefficient of reading-fluency could be as high as 60/16 or 3¾. But should this line be sprinkled with fat, "eye-arresting" "m's" and "w's" and other "eye-focusing" consonants serving as centers at which attention is arrested at twice or three times as many points, the coefficient of reading-fluency would drop correspondingly. And this explains why not even exercise of great skill by designers of earlier genera of typography, (*a*) letter-press, (*b*) typewriter, or (*c*) modified typewriter can overcome this obstacle to rapid reading and reach as high a coefficient of fluency as possible for Organic Typography.

Letterpress Typography was the first mechanized adaptation of the classical Roman convention of hand-lettering such as carved on stone monuments by artists for whom the possible beauty and wholeness of each letter presented a separate challenge. It thus becomes the existing genus of typography based on the convention of adapting type-widths and spacing to the varying contours of separate letters. This not only tends to make of every letter an "eye-focuser" but to systematically sabotage "the series effect." It thus is to be viewed as the existing genus that systematically defeats high reading fluency by preserving structural irregularities carried over from the hand-lettering art.

Typewriter Typography was the second mechanized adaptation now dominated by considerations of machine simplification that led directly to the convention of uniform spacing for all letters regardless of previous widths and contours. Thus it cannot be said that simple considerations of machine simplification lead to the single-double system of spacing forming the base for evolution of Organic Typography. The course of logic and of historical experience, both alike, reveal that simple considerations of machine-simplification lead directly to uniform-spacing, there to become solidly entrenched.

Thruout all of this evolution, the 1-2 system of spacing has remained the despised, ugly duckling consistently avoided by designers of typefaces and of typographic machines. And when considerations other than those of simple machine-simplification next began to reassert themselves, no system was considered acceptable that provided less than three variations of spacing widths from which to choose, either the 2-3-4 unit system or the 2-3-4-5 unit system being preferred (never the 1-2-3 unit system of earlier experiments that yielded "m's" and "w's" too fat and wasteful of space even for imitators of letterpress typography).

Modified Typewriter was thus the third mechanized adaptation based on the convention of limitating letterpress typography as closely as possible by fitting the varying contours of letters to a choice of never less than three variations of unit-spacing thus allowed to dictate the evolution of each such branch of this third genus of typography.

Common to all three of the above remains the convention of treating each letter as a separate whole the eye is invited to single out at the expense of rapid reading. And none makes any consistent effort so to differentiate vowels from consonants that the eye-focusing function of the former and the eye-dispersing function of the latter essential to rapid reading can be adequately dispatched. Thus Organic Typography becomes the first to correlate the organics of printed communication sufficiently to the organics of speech-communication to mutually reinforce the efficiency of both. It is the first to attempt to capitalize in full upon the strengths and virtues in limitation to the 1-2 system of letter-spacing.

Demonstration of one of these virtues, the maximation of regularities incorporated into machine typography, is provided in the utterly simplified typographic apparatus shown in FIGS. 5 thru 11 and 13 and 14 (at four times actual size) of which selective use can be made by keyboard action to reproduce the entire alphabet of letters, figures and punctuation marks shown in FIG. 4 of the accompanying drawings.

All of these figures are formed simply thru selective combination of leg-segments such as shown in "the series effect" of FIG. 1 selected to compose the line of copy shown in FIG. 2, used in combination with leg-connectors shown in various positions of combination in FIGS. 3*a*, *b*, and *c*. FIG. 5 is a plan-view (looking up), FIG. 6 a face-view and FIG. 7 a side view of typical housing 1 used to mount the elongated shanks of these leg-forming and leg-connecting segments, a series of such, two for each leg-combination to be used, being required to compose a complete line of copy.

FIG. 8 shows three side views of this elongated shank of a leg-connector being both elevated and rotated into printing position by the forward movement of prong 9. FIG. 8*a* is a top view of both segments of a leg-connector, either or both of which can be used and therefore requires its separate mounting hole 2 and separate prong 9 to operate same. FIG. 8*b* shows paired leg-connectors in a second and FIG. 8*c* in a third stage of rotation, thru the bearing of the lower part of prong 8 against the shoulder 10 of each leg-connector. FIGURE 9 shows one arm of the carriage 22 holding selector pins 35 (14 on one side of the carriage and 15 on the other) which move from left to right alongside of housings 1 and afford bearing upon the prongs 9 of which selective use is made to elevate type-segments. If the typeface desired is of double-leg construction, the spread of this bearing must be wide enough to command two sets of leg-segments and the paired sets of leg-connectors lying between same. Thus, if only half of this spread has been used to form a letter of single-leg-construction, the carriage correspondingly advances only the width of one housing 1; it advances the width of two housings only when letters of double-leg-construction have been formed.

Figure 10:
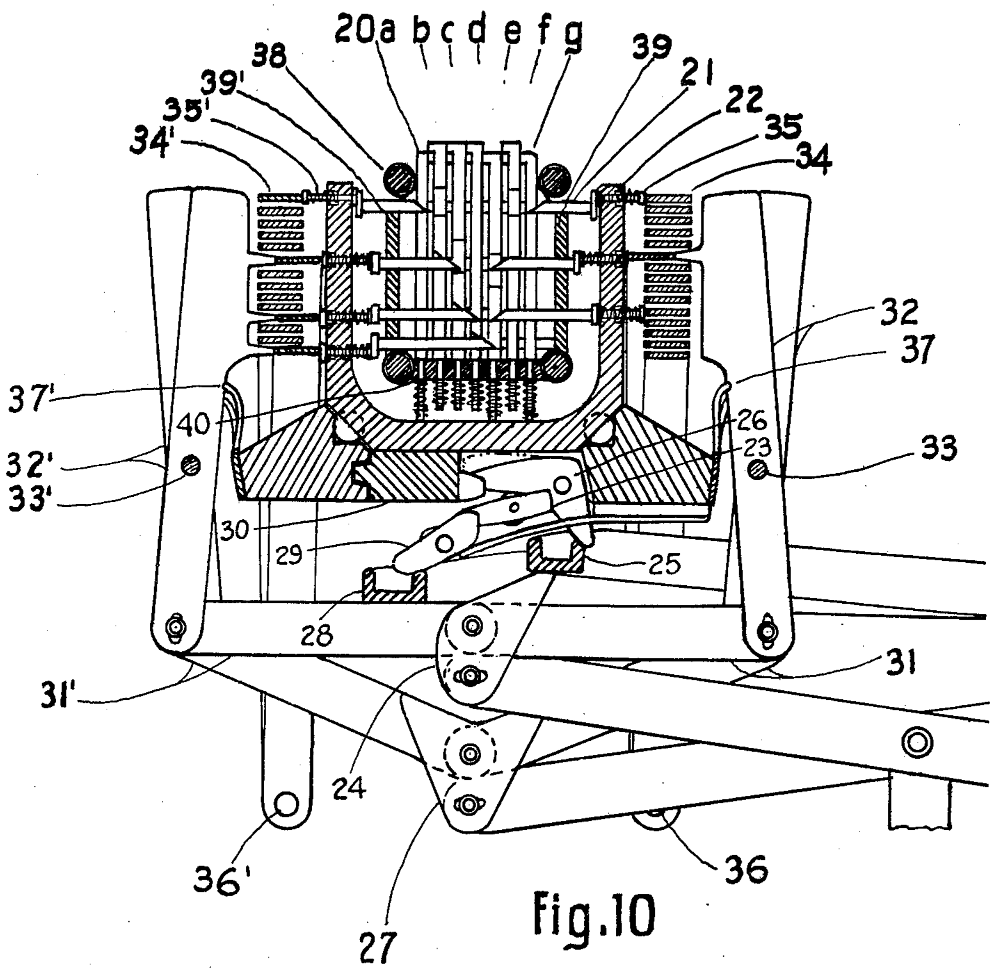
Figure 13:
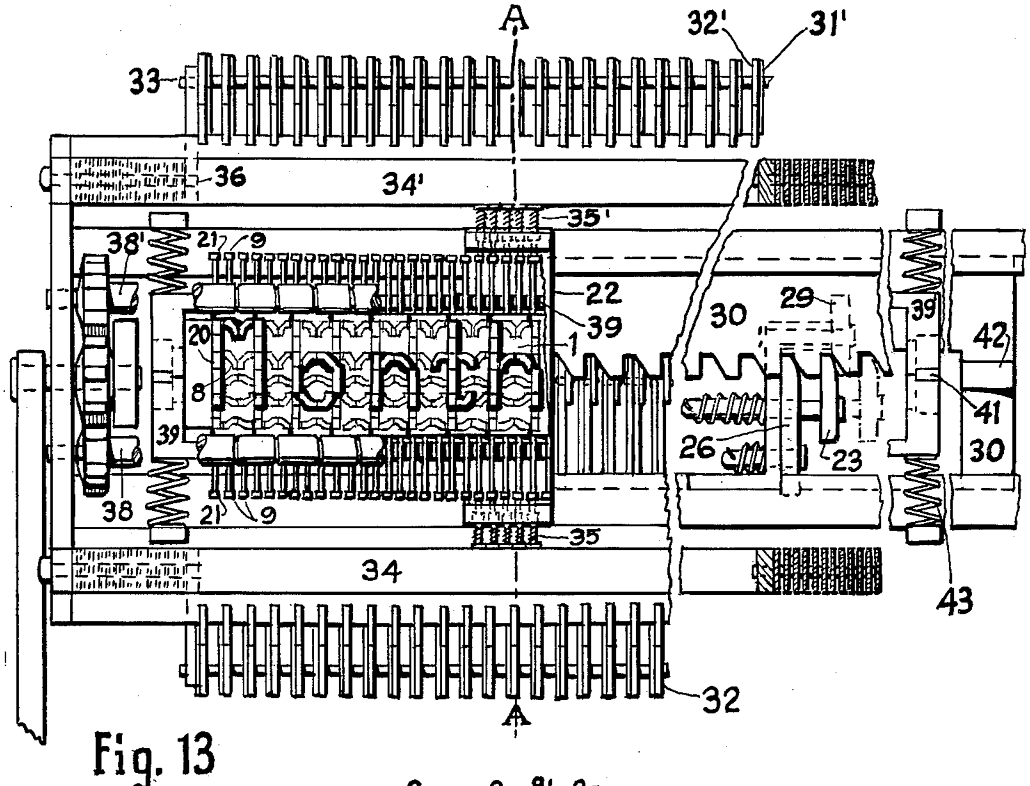
Figure 14:
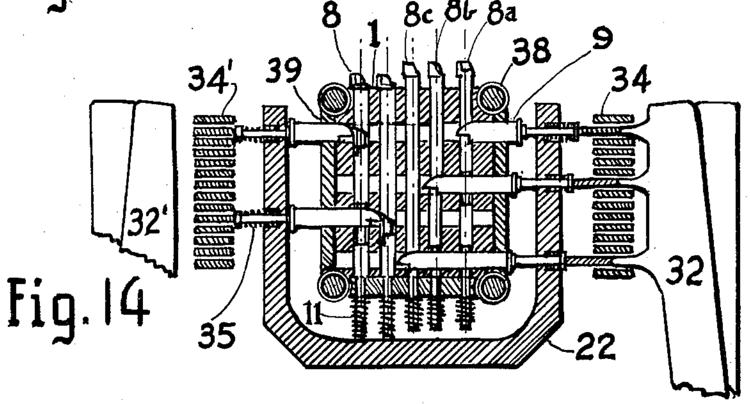

FIG. 10 is a cross-sectional view of type-manifold 20 cutting thru the U-shaped carriage 22 and exposing the face of a typical housing 1 with typical leg-forming elements 20*a* thru *g* and their elevating prongs 21 in full view. FIG. 13 shows a top-view of this type-manifold with its multiplicity of housings 1, each with its complete assembly of leg-forming and leg-connecting type-elements. FIG. 14 is another sectional view of the type-manifold, cutting thru FIG. 13 at A—A to expose typical leg-connectors 8 and their lifting-revolving prongs 9.

Figure 11:
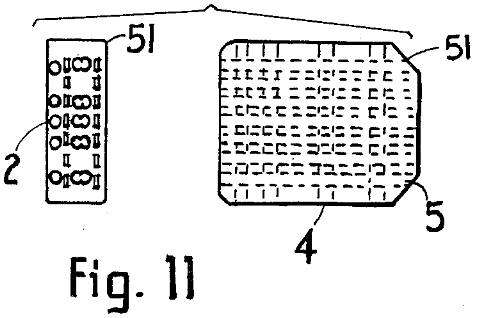

FIG. 11 shows the top and face view of housing 51 used in the different model that prints one letter at a time, as in the conventional typewriter, instead of a complete line at a time as above. The U-shaped carriage 22 remains in stationary relation to this housing 51 and the separate carriage that holds the paper in process of being printed, moves from right to left as successive letters are printed in the customary manner of the conventional typewriter. But this model eliminates opportunity to make any corrections in a line before printing or to justify the line to uniform column width—the distinguishing features of the first presented model to be described in more detail hereafter. However, so compact is the entire printing mechanism of both models that, when operated electrically from a distance, it can be carried in the pocket. Or it can be incorporated into business and accounting machines with corresponding compactness.

More in detail, keyboard operation of typical levers 31 and 31' shown in FIG. 10, operates the pair of typical combs 32 and 32' pivoted on opposite sides of the type-manifold. The inward motion thus imparted to the particular design of teeth on the combs thus selected by keyboard action, imparts corresponding inward motion thru the intermediary of the swingable shutters 34 and 34' to the particular selector pins 35 and 35' in carriage 22 needed to operate the particular elevating prongs 21 and elevating-rotating prongs 9 in the particular housings 1 needed to form the particular letter selected in the sequence of same under composition.

If a letter of single-leg-construction is under formation, the single prong 24 at the juncture of levers 31 and 31' also operates, thru the intermediary of universal bar 25, the escapement mechanism of the spacing rack 30 attached to carriage 22 shown also in plan view in FIG. 13. If a letter of double-leg-construction is under formation, the double prong 27 additionally operates, thru the intermediary of universal bar 28, stop 29 whose removal from the path of escapement-stop 23 thus effected, enables the spacing rack 30 to move the distance of two rack-teeth (and two housings 1) instead of just one as above, when released from mesh with temporary stop 26.

FIG. 10 affords a view of the cut-outs in the shafts of leg-forming segments and FIG. 14, in the cylindrical shafts of leg-connecting segments that enable prongs 21 and prongs 9 to bypass the outer shafts they do not elevate, to reach the inner shafts they do elevate into printing position, thru bearing of their angled or curved ends against the reciprocally angled or curved shoulders on the shafts to be elevated, after which the blunt parts of such indents bear securely on the horizontal surface of prongs. FIG. 14 shows prong 9 advanced into shaft 8*a* only far enough to lift but not to rotate same; second prong 9 advanced into shaft 8*b* sufficiently further to rotate it one-eighth turn; and third prong 9 advanced enough further to advance shaft 8*c* one quarter turn. The torque-tension thus developed in typical coil-springs 11 at the base of each shaft, returns same to start-position and similar springs at the base of leg-forming shafts 20*a* thru *g*, after prongs 9 and 21 have been returned to their start-position thru spread of plates 39 and 39' operating against prong-heads. Said plates 39—39' are spread apart against springs 43 by elevation of wedges 41 and 41' at opposite ends of the type-manifold under movement imparted to same by return of carriage 22 to its start position.

This return of the carriage against the tension set up in the conventional coil-spring not shown herewith, also returns to start position the intermeshed gears on axles 38 and 38' (four in number) between which the multiplicity of housings 1 are so mounted that synchronous rotation of all four axles expands or contracts the spacing between housings sufficiently to justify lines composed to uniform column widths. This is accomplished by engaging the ears 6 at the four corners of each housing within grooves cut on said axles. Since the first housing remains stationary during this column justification, the groove holding same is simply a ring at right angles to the axle; that holding the second housing is angled only very slightly; that holding the third is angled twice as much; that holding the fourth, three times as much and so on until the last is reached. Thus a very slight amount of rotation of the axles can impart sufficient uniform expansion of the entire line to overcome considerable discrepancy in the original width of lines composed. And the slots in spread-plates 39—39' thru which prongs 9 and 21 operate are sufficiently expanded laterally not to interfere with this justification of lines just prior to the printing operation.

It will be observed that the word "Month" shown in composition in FIG. 13 is so shown only to assist recognition. As actually built, the type-manifold would yield characters that are the inverse of those to be reproduced on paper brought in contact with them.

While the examples of Organic Typography provided in FIGS. 2 and 4 and 12(*a*) and 12(*b*) do not illustrate as full development of its organic features as does the example provided in FIG. 1*h*, this in no wise subtracts from their inclusion within the evolution of this new genus of typography whose basic consideration is development of the strengths and virtues implicit in the single-double system of letter-spacing heretofore completely shrouded in neglect.

Having thus described and illustrated my invention, what I claim as new and desire to protect by Letters Patent is the following:

1. A font of types that reproduces the entire English alphabet with letters that occupy either single or double units of letter-spacing and no other, and with vowels treated as eye-focusers and consonants treated as eye-dispersers or directors or arresters.

2. A font of types that reproduces the English alphabet with vowels treated as eye-focusers and consonants treated as eye-dispersers or directors or arresters.

3. Typographic apparatus that reproduces the entire English alphabet with letters that occupy either single or double units of letter-spacing and no other, and with vowels treated as eye-focusers and with consonants treated as eye-dispersers or directors or arresters.

4. Typographic apparatus that reproduces the English alphabet with vowels treated as eye-focusers and consonants treated as eye-dispersers or directors or arresters.

5. A manifold of type-parts comprising slidably mounted leg-parts and rotary leg-connectors, and means to combine same selectively to form varied characters.

6. A manifold of type-parts comprising slidably mounted leg-parts and rotary leg-connectors, and means to combine same selectively to form the entire English alphabet, figures and punctuation marks in whatever sequence is needed to compose lines of copy.

7. Typographic apparatus comprising slidably mounted leg-forming and rotary leg-connecting type-parts and means to combine same selectively to form, in whatever sequence is needed, the varied characters required to reproduce complete lines of copy.

8. Typographic apparatus comprising slidably mounted, segmented leg-forming and rotary leg-connecting type-parts, means to combine same selectively to form varied characters as needed, and means to proportion the spacing of their reproduction variably to the number of legs of which each is formed.

9. Typographic apparatus comprising slidably mounted, leg-forming and rotary leg-connecting type-parts, and means to combine same selectively to form all the varied characters needed simultaneously to reproduce lines of copy and to justify same to uniform column-widths.

10. The combination with a line of type-elements of means to justify said line of type-elements, comprising a plurality of axles having successively more slanted guides on the surface thereof, and extensions on said type-elements nested in the slanted guides of said axles, whereby the synchronous rotation of said axles causes the type-elements to move the successively greater distances needed to increase or decrease the approximately equal distances maintained between said type-elements.

References Cited in the file of this patent

UNITED STATES PATENTS

| | | |
|---|---|---|
| 1,061,639 | Smith | May 13, 1913 |
| 1,579,694 | Fischer | Apr. 6, 1926 |
| 2,664,987 | Schroder | Jan. 5, 1954 |

FOREIGN PATENTS

| | | |
|---|---|---|
| 531,983 | Great Britain | Jan. 15, 1941 |